United States Patent
Tanaka et al.

(10) Patent No.: US 9,459,545 B2
(45) Date of Patent: Oct. 4, 2016

(54) ELECTROPHOTOGRAPHIC PHOTOSENSITIVE MEMBER, MANUFACTURING METHOD OF ELECTROPHOTOGRAPHIC PHOTOSENSITIVE MEMBER, PROCESS CARTRIDGE AND ELECTROPHOTOGRAPHIC APPARATUS, AND A SOLID SOLUTION AND MANUFACTURING METHOD OF A SOLID SOLUTION

(71) Applicant: CANON KABUSHIKI KAISHA, Tokyo (JP)

(72) Inventors: Masato Tanaka, Tagata-gun (JP); Tsutomu Nishida, Mishima (JP); Masataka Kawahara, Mishima (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/740,941

(22) Filed: Jun. 16, 2015

(65) Prior Publication Data

US 2015/0370181 A1  Dec. 24, 2015

(30) Foreign Application Priority Data

Jun. 23, 2014  (JP) ................. 2014-128302

(51) Int. Cl.
 *G03G 5/06* (2006.01)
 *C09B 47/04* (2006.01)
 *C09B 47/08* (2006.01)

(52) U.S. Cl.
 CPC ........... *G03G 5/0696* (2013.01); *C09B 47/045* (2013.01); *C09B 47/085* (2013.01); *G03G 5/0653* (2013.01)

(58) Field of Classification Search
 CPC .............. G03G 5/0696; G03G 5/0653; C09B 47/045; C09B 47/085
 USPC .................... 430/59.4, 78; 540/141
 See application file for complete search history.

(56) References Cited

U.S. PATENT DOCUMENTS

| | | | |
|---|---|---|---|
| 5,248,336 A * | 9/1993 | Gerson | C09B 67/0035 106/411 |
| 5,834,149 A * | 11/1998 | Tambo | C09B 67/0016 106/413 |
| 6,391,505 B1 | 5/2002 | Hamasaki et al. | |
| 6,544,325 B2 * | 4/2003 | Hall-Goulle | C09B 67/0033 106/410 |
| 6,683,175 B2 | 1/2004 | Tanaka | |
| 7,527,904 B2 * | 5/2009 | Wu | G03G 5/0629 399/159 |
| 8,518,615 B2 | 8/2013 | Tanaka | |
| 8,974,991 B2 | 3/2015 | Kawahara et al. | |
| 2005/0081755 A1 * | 4/2005 | Bugnon | C09B 67/0014 106/494 |
| 2014/0170540 A1 | 6/2014 | Tanaka | |
| 2014/0170541 A1 | 6/2014 | Tanaka | |
| 2014/0170542 A1 | 6/2014 | Tanaka | |
| 2015/0093694 A1 | 4/2015 | Watariguchi et al. | |
| 2015/0309426 A1 | 10/2015 | Nishida et al. | |
| 2015/0316862 A1 | 11/2015 | Kuno et al. | |
| 2015/0316863 A1 | 11/2015 | Tanaka et al. | |

FOREIGN PATENT DOCUMENTS

| | | |
|---|---|---|
| JP | 4-351673 A | 12/1992 |
| JP | 5-333575 A | 12/1993 |
| JP | 2666541 B2 * | 6/1997 |
| JP | 2001-40237 A | 2/2001 |
| JP | 2002-12791 A | 1/2002 |
| JP | 2002-371202 A | 12/2002 |
| JP | 2011-94101 A | 5/2011 |

OTHER PUBLICATIONS

English language machine translation of JP 2666541 B2 (Jun. 1997).*

(56) References Cited

OTHER PUBLICATIONS

U.S. Appl. No. 14/730,482, filed Jun. 4, 2015. Inventor: Masato Tanaka, et al.

\* cited by examiner

*Primary Examiner* — Christopher Rodee
(74) *Attorney, Agent, or Firm* — Fitzpatrick, Cella, Harper & Scinto (57) ABSTRACT

The present invention provides an electrophotographic photosensitive member which can output images with reduced image defects due to ghosting not only under a normal temperature and normal humidity environment but also even under a low temperature and low humidity environment as especially severe conditions, and a manufacturing method thereof; and a process cartridge and an electrophotographic apparatus each having the electrophotographic photosensitive member. Accordingly, the electrophotographic photosensitive member of the present invention having a support and a photosensitive layer on the support includes the photosensitive layer which contains a solid solution of hydroxygallium phthalocyanine and a compound represented by the following Formula (1) or Formula (1)', the solid solution having peaks at Bragg angles 2θ of 7.4°±0.3° and 28.3°±0.3° in CuKα characteristic X-ray diffraction.

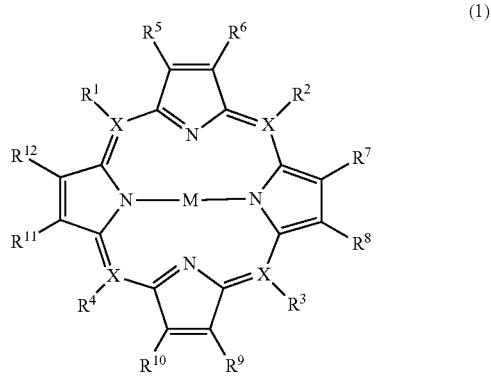

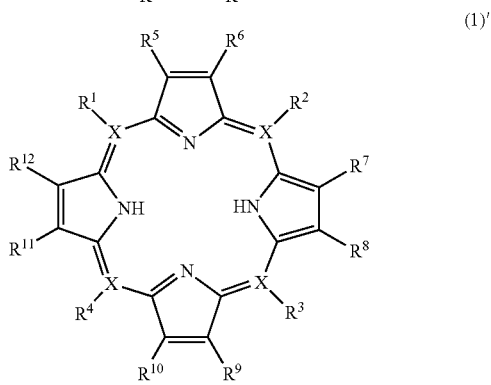

17 Claims, 5 Drawing Sheets

ELECTROPHOTOGRAPHIC PHOTOSENSITIVE MEMBER, MANUFACTURING METHOD OF ELECTROPHOTOGRAPHIC PHOTOSENSITIVE MEMBER, PROCESS CARTRIDGE AND ELECTROPHOTOGRAPHIC APPARATUS, AND A SOLID SOLUTION AND MANUFACTURING METHOD OF A SOLID SOLUTION

BACKGROUND OF THE INVENTION

1. Field of the Invention

The present invention relates to an electrophotographic photosensitive member, a manufacturing method of an electrophotographic photosensitive member, a process cartridge and an electrophotographic apparatus each having an electrophotographic photosensitive member, and a solid solution and a manufacturing method of a solid solution.

2. Description of the Related Art

Since the oscillation wavelength of a semiconductor laser commonly used as an image exposing unit in the field of electrophotography is in the long wavelength range of 650 to 820 nm, electrophotographic photosensitive members having high sensitivity to the light in the long wavelength range are currently under development.

A phthalocyanine pigment is an effective charge generating substance having a high sensitivity for light in the long-wavelength region. In particular, oxytitanium phthalocyanine and gallium phthalocyanine have excellent sensitivity properties, and various crystal forms thereof have been reported thus far.

Although an electrophotographic photosensitive member using a phthalocyanine pigment has excellent sensitivity properties, a problem is that the generated photo carriers tend to remain in a photosensitive layer so as to act as a memory, easily causing potential variation such as ghosting.

Japanese Patent Application Laid-Open No. 2001-040237 and Japanese Patent Application Laid-Open No. H05-333575 disclose that the addition of a specific organic electron acceptor or an N-type conductive pigment during the acid pasting process of a phthalocyanine pigment has a sensitizing effect. This method, however, has causes concerns of the chemical change of an additive (an organic electron acceptor or an N-type conductive pigment), with a problem of difficulty in the transformation into a desired crystal form.

Further, Japanese Patent Application Laid-Open No. H04-351673 discloses that a mixed crystal of oxytitanyl phthalocyanine and hydroxygallium phthalocyanine is useful as a charge generating substance.

Various attempts have been made to improve electrophotographic photosensitive members as described above.

For further improvement in high-quality picture in recent years, it is desired to prevent image degradation due to ghosting in various environments.

SUMMARY OF THE INVENTION

The present invention is directed to providing an electrophotographic photosensitive member which reduces image defects due to ghosting not only under a normal temperature and normal humidity environment but also even under a low temperature and low humidity environment as especially severe conditions, and a manufacturing method of the electrophotographic photosensitive member; and a process cartridge and an electrophotographic apparatus.

Further, the present invention is directed to providing a solid solution and a manufacturing method of a solid solution.

According to one aspect of the present invention, there is provided an electrophotographic photosensitive member comprising a support and a photosensitive layer on the support; the photosensitive layer including a solid solution of hydroxygallium phthalocyanine and a compound represented by the following Formula (1) or Formula (1)'; the solid solution having peaks at Bragg angles 2θ of 7.4°±0.3° and 28.3°±0.3° in CuKα characteristic X-ray diffraction:

wherein M represents a metal atom which may have an axial ligand; X represents a carbon atom or a nitrogen atom; $R^1$ to $R^{12}$ each independently represent a hydrogen atom, a substituted or unsubstituted aryl group, or a substituted or unsubstituted a heterocyclic group, with the proviso that in the case of X being a nitrogen atom, the ring is closed and none of substituents $R^1$ to $R^4$ exists.

According to another aspect of the present invention, there is provided a process cartridge which integrally supports the electrophotographic photosensitive member and at least one unit selected from the group consisting of a charging unit, a developing unit, and a cleaning unit, the cartridge being detachably mountable to a main body of an electrophotographic apparatus.

According to further aspect of the present invention, there is provided an electrophotographic apparatus having the electrophotographic photosensitive member, with a charging unit, an exposure unit, a developing unit and a transfer unit.

According to further aspect of the present invention, there is provided a solid solution of hydroxygallium phthalocyanine and a compound represented by the following Formula (1) or Formula (1)';

the solid solution having peaks at Bragg angles 2θ of 7.4°±0.3° and 28.3°±0.3° in CuKα characteristic X-ray diffraction:

wherein M represents or a metal atom which may have an axial ligand; X represents a carbon atom or a nitrogen atom; $R^1$ to $R^{12}$ each independently represent a hydrogen atom, a substituted or unsubstituted aryl group, or a substituted or unsubstituted a heterocyclic group, with the proviso that in the case of X being a nitrogen atom, the ring is closed and none of substituents $R^1$ to $R^4$ exists.

According to further aspect of the present invention, there is provided a manufacturing method of a solid solution of the hydroxygallium phthalocyanine and a compound represented by Formula (1) including adding hydroxygallium phthalocyanine and the compound represented by the Formula (1) or the Formula (1)' to a solvent and milling the mixture.

According to further aspect of the present invention, there is provided a manufacturing method of an electrophotographic photosensitive member having a support and a photosensitive layer formed on the support including manufacturing the solid solution by the manufacturing method of a solid solution and forming the photosensitive layer by forming a coating film from a coating liquid for forming a photosensitive layer which contains the solid solution and drying the coating film.

According to the present invention, an electrophotographic photosensitive member which reduces image defects due to ghosting not only under a normal temperature and normal humidity environment but also even under a low temperature and low humidity environment as especially severe conditions, and a manufacturing method thereof; and a process cartridge and an electrophotographic apparatus can be obtained.

Further, according to the present invention, a solid solution having excellent properties as a charge generating substance and a manufacturing method thereof can be provided. Further, a manufacturing method of an electrophotographic photosensitive member using the solid solution can be provided.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

As described above, an electrophotographic photosensitive member of the present invention includes a support and a photosensitive layer formed on the support.

The present invention relates to an electrophotographic photosensitive member including the electrophotographic layer which contains a solid solution of hydroxygallium phthalocyanine and a compound represented by the following Formula (1), the solid solution having peaks at Bragg angles 2θ of 7.4 °±0.3° and 28.3°±0.3° in CuKα characteristic X-ray diffraction.

In the Formula (1), M represents a hydrogen atom or a metal atom which may have an axial ligand.

In addition, in the case of M being a hydrogen atom, the porphyrin compound represented by the Formula (1) is a metal-free porphyrin compound represented by the following Formula (1)'.

(1)'

Examples of M in the Formula (1) include a metal atom such as Mg, Zn, Ni, Cu, V, Ti, Ga, Sn, In, Al, Mn, Fe, Co, Pd, Ge and Mo, and examples of the axial ligand include a halogen atom, an alkoxy group, an amino group and an alkylamino group.

Further, X represents a carbon atom or a nitrogen atom. In addition, in the case of X representing a nitrogen atom, the porphyrin compound represented by the Formula (1) is a tetraazaporphyrin compound represented by the following Formula (1)''.

(1)''

In the Formulas (1), (1)' and (1)'', $R^1$ to $R^{12}$ each independently represent a hydrogen atom, a substituted or unsubstituted aryl group, or a substituted or unsubstituted heterocyclic group. In the case of X being a nitrogen atom, however, the ring is closed as in the Formula (1)'' and none of substituents $R^1$ to $R^4$ exists.

Examples of the substituent of the substituted or unsubstituted aryl group and the substituent of the substituted or unsubstituted heterocyclic group in the Formula (1) include an alkyl group such as a methyl group and an ethyl group, an alkoxy group such as a methoxy group and an ethoxy group, a dialkylamino group such as a dimethylamino group and a diethylamino group, a halogen atom such as a fluorine atom, a chlorine atom and bromine atom, a nitro group, a cyano group, a phenyl group and a formyl group.

In the porphyrin compounds represented by the Formula (1), preferably X is a carbon atom, and $R^1$ to $R^{12}$ are each independently a hydrogen atom, an aryl group or a heterocyclic group. More preferably $R^5$ to $R^{12}$ are each a hydrogen atom. Further, preferably $R^1$ to $R^4$ are each a pyridyl group, particularly preferably 4-pyridyl group.

In the porphyrin compounds represented by the Formula (1), preferably X is a nitrogen atom, and $R^5$ to $R^{12}$ are each independently a hydrogen atom, an aryl group or a heterocyclic group. More preferably $R^5$ to $R^{12}$ are each a phenyl group or a pyridyl group.

In the porphyrin compounds represented by the Formula (1), a metal-free porphyrin compound represented by the Formula (1)' with M being a hydrogen atom is preferred.

Preferred specific examples (exemplary compounds) of the porphyrin compound represented by the Formula (1) contained in the solid solution of the present invention are described in the following, though the present invention is not limited thereto.

Exemplary compound (1)

Exemplary compound (2)

Exemplary compound (3)

Exemplary compound (4)

Exemplary compound (5)

Exemplary compound (6)

Exemplary compound (7)

Exemplary compound (8)

Exemplary compound (9)

Exemplary compound (10)

Exemplary compound (11)

Exemplary compound (12)

Exemplary compound (13)

Exemplary compound (14)

Exemplary compound (15)

Exemplary compound (16)

Exemplary compound (17)

Exemplary compound (18)

Exemplary compound (19)

Exemplary compound (20)

Hydroxygallium phthalocyanine contained in the solid solution of the present invention is a compound represented by the following Formula (2).

(2)

In the Formula, $Y^1$, $Y^2$, $Y^3$ and $Y^4$ each represent Cl, and n, m, p and k each are an integer of 0 to 4. However, $Y^1$, $Y^2$, $Y^3$ and $Y^4$ each represent a hydrogen atom, with n, m, p and k each being 0.

Among the solid solution of the present invention, a solid solution which contains an amide solvent or a sulfoxide solvent is preferred. More specifically, a solid solution which contains at least one selected from the group consisting of N,N-dimethylformamide, N-methylformamide, N-methyl-2-pyrrolidone and dimethylsulfoxide is preferred. Among the solid solution, a solid solution which contains at least one selected from the group consisting of N,N-dimethylformamide and N-methylformamide is particularly preferred, having sufficient effect of the present invention.

Among the solid solution of the present invention, a solid solution having a content of the porphyrin compound represented by the Formula (1) of 0.1% by mass or more and 40% by mass or less is more preferred, and a solid solution having a content of the compound of 5% by mass or more and 30% by mass or less is particularly preferred, having effective action of the present invention.

The manufacturing method of the solid solution of the present invention is described in the following.

The solid solution of the present invention is obtained by adding hydroxygallium phthalocyanine and the porphyrin compounds represented by the Formula (1) to a solvent and wet-milling the mixture to perform a crystal transformation process of phthalocyanine. The hydroxygallium phthalocyanine for use in the milling treatment can be a hydroxygallium phthalocyanine obtained by acid pasting of gallium phthalocyanine halide.

The milling treatment is a treatment in a milling device such as a sand mill and a ball mill, using dispersion material such as glass beads, steel beads and alumina balls. The milling time can be about 5 to 100 hours. The particularly preferable method includes performing sampling every 5 to 10 hours so as to check the Bragg angle of the crystal. The amount of dispersion material in milling treatment can be 10 to 50 times the amount of gallium phthalocyanine by mass. Examples of the solvent for use include an amide solvent such as N,N-dimethylformamide, N,N-dimethylacetoamide, N-methylformamide, N-methylacetoamide, N-methylpropionamide and N-methyl-2-pyrrolidone, an ether solvent such as tetrahydrofuran, and sulfoxide solvent such as dimethyl sulfoxide. The used amount of solvent can be 5 to 30 times the amount of phthalocyanine on mass basis. The used amount of the porphyrin compounds represented by the Formula (1) can be 0.01 to 1.0 times the amount of hydroxygallium phthalocyanine on mass basis.

The "solid solution" in the present invention has a structure including a host crystal lattice of hydroxygallium phthalocyanine in which a specific porphyrin is dissolved as a guest. The X-ray diffraction pattern of the powder is similar to the X-ray diffraction pattern of the simple substance of the host.

The verification whether a solid solution is formed from 2 or more pigments can be performed by powder X-ray diffraction analysis or the like. In the case of a simple mixture of 2 or more pigments, a pattern can be obtained corresponding to overlapping X-ray diffraction patterns of the respective pigments, with peak intensities proportional to the blending ratios of the respective pigments. In contrast, in the case of a solid solution being formed, a pattern similar to (almost identical to) the X-ray diffraction pattern of the simple substance of the host is obtained. Alternatively a totally new X-ray diffraction pattern may be obtained.

The content of hydroxygallium phthalocyanine, the porphyrin compounds represented by the Formula (1), and the solvent such as N,N-dimethylformamide, in the solid solution of the present invention was determined by analysis of the NMR measurement data of the solid solution. The content is represented by the ratio to the mass of the solid solution.

The powder X-ray diffraction, mass analysis, and NMR measurement of the solid solution of the present invention were performed under the following conditions.

[Powder X-ray Diffraction Analysis]
Measurement instrument: X-ray diffraction analyzer RINT-TTRII made by Rigaku Corporation
X-ray tube: Cu
X-ray tube voltage: 50 kV
X-ray tube current; 300 mA
Scanning method: 2θ/θ scan
Scanning rate: 4.0°/minute
Sampling interval: 0.02°
Starting angle (2θ): 5.0°
Stopping angle (2θ): 40.0°
Attachment: Standard sample holder
Filter: non-use
Incident monochrome: in-use
Counter monochrometer: non-use
Divergence slit: open
Vertical divergence limiting slit: 10.00 mm
Scattering slit: open
Light receiving slit: open
Flat plate monochrometer: in use
Counter: scintillation counter

[Mass Analysis Measurement]
Measuring instrument for use: TraceDSQ-MASS SPECTROMETER, made by Thermo Electron Co., Ltd.
Measurement mode: Direct Probe

[NMR Measurement]
Measurement instrument: AVANCE III 500 made by Bruker
Solvent: deuterium sulfate ($D_2SO_4$)

The solid solution of the present invention has an excellent function as a photoconductive material, and is applicable to a solar cell, a sensor, a switching device and the like, in addition to an electrophotographic photosensitive member.

Subsequently, the case of using the solid solution of the present invention as the charge generating substance in an electrophotographic photosensitive member is described in the following.

The electrophotographic photosensitive member of the present invention has a support and a photosensitive layer formed on the support. A photosensitive layer includes: a single-layer type photosensitive layer having a single layer which contains a charge generating substance and a charge transporting substance; and a laminate type photosensitive layer having a lamination structure of a charge generation layer which contains a charge generating substance and a charge transport layer which contains a charge transporting substance. Among them, a laminate type photosensitive layer having a charge generation layer, and a charge transport layer formed on the charge generation layer can be used.

The support for use in the electrophotographic photosensitive member of the present invention can have conductivity (conductive support). The support may be made of, for example, metal such as aluminum, aluminum alloy, copper, zinc, stainless steel, vanadium, molybdenum, chromium, titanium, nickel, indium, gold and platinum, and metal alloy. Alternatively, a support may be made of a plastic coated with a vacuum deposited layer of aluminum, aluminum alloy, indium oxide, tin oxide or indium oxide-tin oxide alloy. Alternatively, a support may be made of a plastic or the support coated with conductive particles and a binder resin; a plastic or paper support impregnated with conductive particles; or a plastic including a conductive polymer, or the like.

In the electrophotographic photosensitive member of the present invention, an undercoat layer (also referred to as a barrier layer or an intermediate layer) having a barrier function and an adhesive function may be disposed between the support and the photosensitive layer. An undercoat layer can be formed by forming a coating film made from a coating liquid for forming an undercoat layer obtained by mixing a binder resin and a solvent, and drying the coating film.

Examples of the material for use in an undercoat layer include polyvinyl alcohol, polyethylene oxide, ethyl cellulose, methyl cellulose, casein, polyamide (e.g., nylon 6, nylon 66, nylon 610, copolymerized nylon, N-alkoxy methylated nylon), polyurethane, glue, aluminum oxide and gelatin. The undercoat layer has a film thickness of 0.1 to 10 μm, preferably 0.5 to 5 μm.

In the case of forming a single-layer type photosensitive layer, the solid solution of the present invention is used as the charge generating substance, and along with the charge transporting substance is mixed into a binder resin solution so as to prepare a coating liquid for forming a photosensitive layer. The coating liquid for forming a photosensitive layer is applied onto a support so as to form a coating film, and drying the produced coating film to form a photosensitive layer.

In the case of forming a laminate-type photosensitive layer, a charge generation layer can be formed by dispersing solid solution of the present invention in a binder resin solution so as to prepare a coating liquid for forming the charge generation layer, applying the coating liquid to form a coating film, and drying the produced coating film. Alternatively the charge generation layer may be formed by vapor deposition.

In the case of forming a laminate-type photosensitive layer, a charge transport layer can be formed by dissolving a charge transporting substance and a binder resin in a solvent so as to prepare a coating liquid for forming the charge transport layer, and applying the coating liquid on the charge generation layer so as to form a coating film, and drying the produced coating film.

Examples of the charge transporting substance include a triarylamine-based compound, a hydrazine-based compound, a stilbene-based compound, a pyrazoline-based compound, an oxazole-based compound, a thiazole-based compound and a triallylmethane-based compound.

Examples of the binder resin for use in the single-layer type photosensitive layer, the charge generation layer and the charge transport layer include the following. For example, a resin such as polyester, an acrylic resin, polyvinylcarbazole, a phenoxy resin, polycarbonate, polyvinylbutyral, polystyrene, polyvinyl acetate, polysulfone, polyalylate, vinylidene chloride, acrylonitrile copolymer and polyvinyl benzal is used.

Examples of the application method to form a photosensitive layer include dip coating, spray coating, spinner coating, bead coating, blade coating and beam coating.

A single-layer type photosensitive layer can have a film thickness of 5 to 40 μm, more preferably 10 to 30 μm.

The charge generation layer of a laminate type photosensitive layer can have a film thickness of 0.01 to 10 μm, more preferably 0.1 to 3 μm. The charge transport layer can have a film thickness of 5 to 40 μm, more preferably 10 to 30 μm.

The content of the charge generating substance in the charge generation layer of a laminate type photosensitive layer can be 20 to 90% by mass relative to the total mass of the charge generation layer, more preferably 50 to 80% by mass. The content of the charge transporting substance in the charge transport layer can be 20 to 80% by mass relative to the total mass of the charge transport layer, more preferably 30 to 70% by mass.

The content of the charge generating substance of a single-layer type photosensitive layer can be 3 to 30% by mass relative to the total mass of the photosensitive layer. The content of the charge transporting substance can be 30 to 70% by mass relative to the total mass of the photosensitive layer.

The solid solution of the present invention may be mixed with another charge generating substance for use as charge generating substance. In that case, the content of the solid solution of the present invention can be 50% by mass or more relative to the total charge generating substance.

A protective layer may be provided on the photosensitive layer on an as needed basis. The protective layer can be formed by dissolving a binder resin in a solvent so as to prepare the coating liquid for forming a protective layer, forming a coating film from the coating liquid, and drying the produced coating film. Examples of the binder resin for use in the protective layer include, for example, polycarbonate (e.g., polycarbonate Z and modified polycarbonate), polyallylate, polyurethane, a styrene-butadiene copolymer, a styrene-acrylic acid co-polymer and a styrene-acrylonitrile co-polymer.

The protective layer can have a film thickness of 0.05 to 20 μm.

The protective layer may contain conductive particles or an ultraviolet absorbing agent. Examples of the conductive particles include metal oxide particles such as tin oxide particles.

Figure 1:
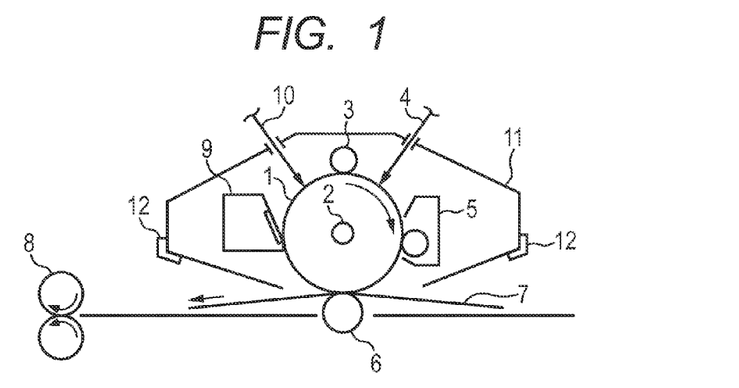
FIG. 1 is a schematic view of an electrophotographic apparatus provided with a process cartridge having an electrophotographic photosensitive member of the present invention.

FIG. 1 is a schematic view of an electrophotographic apparatus provided with a process cartridge having an electrophotographic photosensitive member of the present invention.

An electrophotographic photosensitive member 1 having a cylindrical shape (drum shape), is rotation driven around an axis 2 at a predetermined circumferential speed (process speed) in an arrow direction.

The surface of the electrophotographic photosensitive member 1 is electrostatically charged to a positive or negative predetermined potential with a charging unit 3 during in a rotation process. Subsequently the charged surface of the electrophotographic photosensitive member 1 is irradiated with image exposing light 4 from an image exposing unit (not drawn in figure) so as to form an electrostatic latent image corresponding to objective image information. The image exposing light 4 are intensity-modulated in response to the time-series electric digital image signals of objective image information, outputted from, for example, an image exposing unit for slit exposing or exposing with scanning laser beams.

The electrostatic latent image formed on the surface of the electrophotographic photosensitive member 1 is developed (normal development or reversal development) with toner stored in a developing unit 5 so as to form a toner image on the surface of the electrophotographic photosensitive member 1. The toner image formed on the surface of the electrophotographic photosensitive member 1 is transferred to a transfer material 7 with a transfer unit 6. On this occasion, a bias voltage having a polarity reversal of the charge retained on the toner is applied to the transfer unit 6 from a bias power supply (not drawn in figure). A transfer material 7 of paper is taken out from a paper feeding part (not drawn in figure) so as to be fed between the electrophotographic photosensitive member 1 and the transfer unit 6 in synchronization with the rotation of the electrophotographic photosensitive member 1.

The transfer material 7 having a toner image transferred from the electrophotographic photosensitive member 1 is separated from the surface of the electrophotographic photosensitive member 1 and transported to an image fixation unit 8 for the fixation of the toner image. An image formed object (print or copy) is thus printed out from an electrophotographic apparatus.

After transfer of the toner image to the transfer material 7, the surface of the electrophotographic photosensitive member 1 is cleaned with a cleaning unit 9 to remove attached material such as toner (remaining toner after transfer). In a recently developed cleaner-less system, toner may be directly removed after transfer with a development apparatus or the like. Subsequently the surface of the electrophotographic photosensitive member 1 is neutralized with pre-exposing light 10 from a pre-exposing unit (not drawn in figure) and then repeatedly used for image formation. The pre-exposing unit is not necessarily required for a contact charging unit 3 having a charging roller.

In the present invention, a plurality of components selected from the electrophotographic photosensitive member 1, the charging unit 3, the developing unit 5, the cleaning unit 9, and the like may be accommodated in a container and integrally supported to form a process cartridge. The process cartridge can be configured to be detachable to an electrophotographic apparatus body. At least one selected from, for example, the group consisting of a charging unit 3, a developing unit 5 and a cleaning unit 9 is integrally supported together with an electrophotographic photosensitive member 1 so as to form a cartridge. The cartridge constitutes a process cartridge 11 detachable to an electrophotographic apparatus body with a guiding unit 12 such as a rail of the electrophotographic apparatus body.

Image exposing light 4 may be reflected beams from or transmitted beams through a sheet of manuscript for an electrophotographic apparatus such as a copy machine and a printer. Alternatively, image exposing light 4 may be radiated beams produced by scanning of laser beams, driving of an LED array or driving of a liquid crystal shutter array in response to signals from a manuscript reading sensor.

The electrophotographic photosensitive member 1 of the present invention can be widely used in an electrophotography application field such as a laser beam printer, a CRT printer, an LED printer, a FAX, a liquid crystal printer and a laser engraving.

EXAMPLES

The present invention is described further in detail in reference to specific Synthesis Example and Examples in the following, although the present invention is not limited thereto. The film thickness of each of the layers of electrophotographic photosensitive members in Examples and Comparative Examples was obtained with an eddy-current film thickness meter (Fischerscope made by Fischer Instruments K.K.), or based on the specific gravity converted from a mass per unit area. In the Examples, the term "parts" means "parts by mass".

Example 1-1

Figure 2:
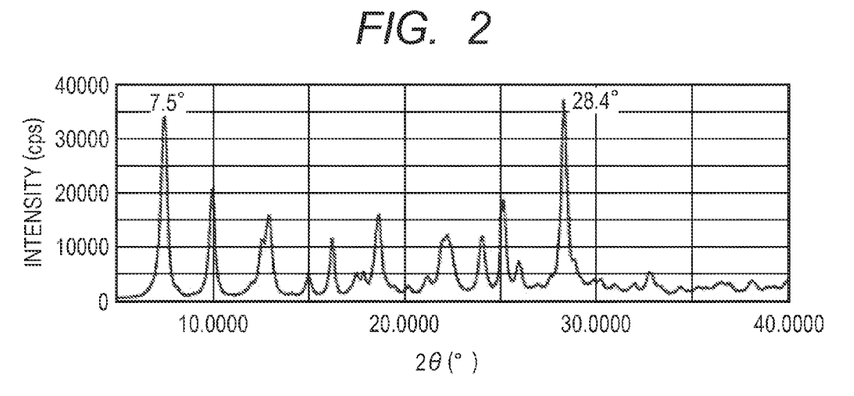
FIG. 2 is a powder X-ray diffraction chart of a solid solution obtained in Example 1-1.

Together with 15 parts of glass beads having a diameter of 0.8 mm, 0.5 parts of hydroxygallium phthalocyanine obtained by the same treatment as in (Example 1-1) described in Japanese Patent Application Laid-Open No. 2011-094101, 0.1 parts of an exemplary compound (1) obtained by the same way as in <synthesis example 3> described in Japanese Patent Application Laid-Open No. 2002-371202, and 9.5 parts of N,N-dimethylformamide were subjected to milling treatment with a ball mill at room temperature (23° C.) for 48 hours. Gallium phthalocyanine crystals were taken out from the dispersion liquid using N,N-dimethylformamide, and filtrated. The material on the filter was thoroughly washed with N,N-dimethylformamide, and subsequently thoroughly washed with tetrahydrofuran. The filtrand was vacuum dried, so that 0.54 parts of a solid solution having peaks at Bragg angles $2\theta\pm0.2°$ of $7.5°$ and $28.4°$ in CuKα characteristic X-ray diffraction was obtained. The powder X-ray diffraction chart of the obtained solid solution is illustrated in FIG. 2.

From the NMR measurement, it was confirmed that 17.65% by mass of the exemplary compound (1) and 2.62% by mass of N,N-dimethylformamide were contained in the solid solution in terms of the proton ratio relative to hydroxygallium phthalocyanine.

Example 1-2

Figure 3:
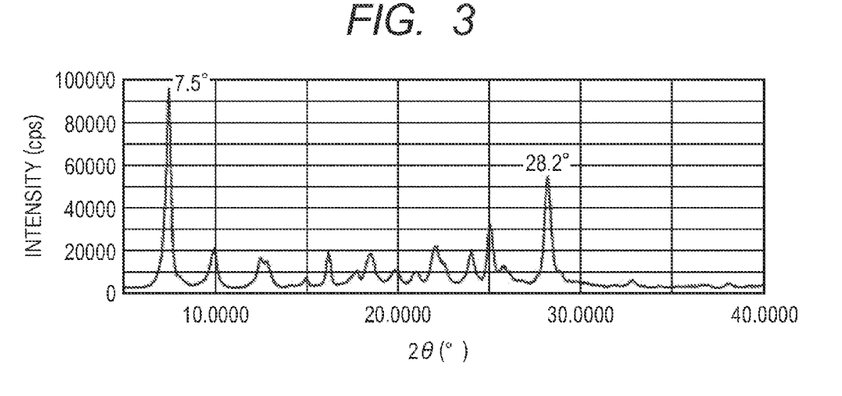
FIG. 3 is a powder X-ray diffraction chart of a solid solution obtained in Example 1-2.

In Example 1-1, 9.5 parts of N,N-dimethylformamide was replaced with 9.5 parts of N-methylformamide in the milling treatment. By the same treatment as in Example 1-1 except for the replacement, 0.44 parts of a solid solution having peaks at Bragg angles $2\theta\pm0.2°$ of $7.5°$ and $28.2°$ in CuKα characteristic X-ray diffraction was obtained. The powder X-ray diffraction chart of the obtained solid solution is illustrated in FIG. 3. From the NMR measurement, it was confirmed that 16.50% by mass of the exemplary compound (1) and 2.64% by mass of N-methylformamide were contained in the solid solution.

Example 1-3

Figure 4:
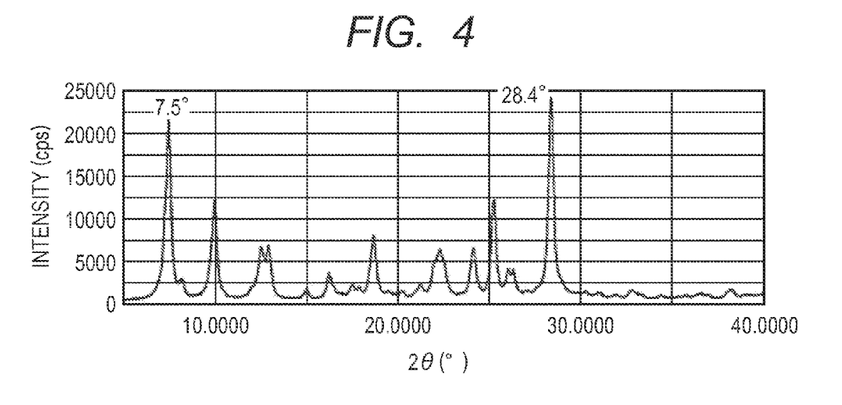
FIG. 4 is a powder X-ray diffraction chart of a solid solution obtained in Example 1-3.

In Example 1-1, the amount of exemplary compound (1) was changed from 0.1 parts to 0.05 parts. By the same treatment as in Example 1-1 except for the change, 0.47 parts of a solid solution having peaks at Bragg angles $2\theta\pm0.2°$ of $7.5°$ and $28.3°$ in CuKα characteristic X-ray diffraction was obtained. The powder X-ray diffraction chart of the obtained solid solution is illustrated in FIG. 4.

From the NMR measurement, it was confirmed that 7.08% by mass of the exemplary compound (1) and 2.21% by mass of N,N-dimethylformamide were contained in the solid solution.

Example 1-4

In Example 1-1, the amount of exemplary compound (1) was changed from 0.1 parts to 0.015 parts. By the same treatment as in Example 1-1 except for the change, 0.44 parts of a solid solution having peaks at Bragg angles $2\theta\pm0.2°$ of $7.5°$ and $28.3°$ in CuKα characteristic X-ray diffraction was obtained. The powder X-ray diffraction chart of the obtained solid solution was the same as in FIG. 4.

From the NMR measurement, it was confirmed that 0.81% by mass of the exemplary compound (1) and 2.14% by mass of N,N-dimethylformamide were contained in the solid solution.

Example 1-5

Figure 5:
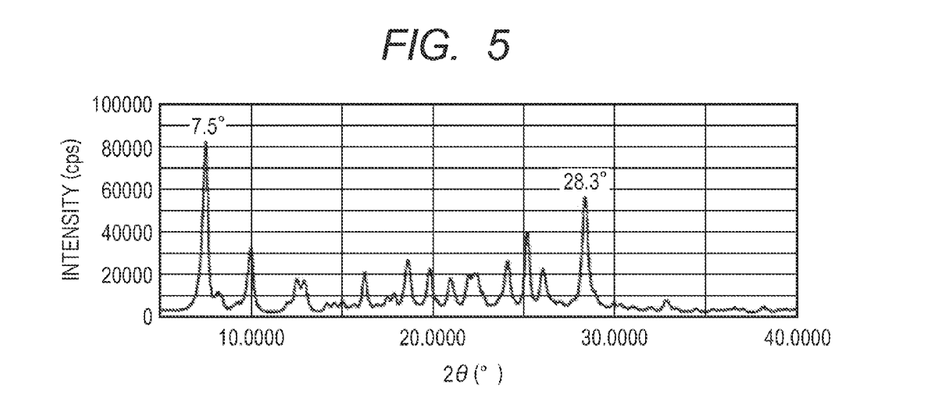
FIG. 5 is a powder X-ray diffraction chart of a solid solution obtained in Example 1-5.

In Example 1-1, the amount of the exemplary compound (1) was changed from 0.1 parts to 0.2 parts, and the milling treatment time was changed from 48 hours to 90 hours. By the same treatment as in Example 1-1 except for the changes, 0.65 parts of a solid solution having peaks at Bragg angles $2\theta\pm0.2°$ of $7.5°$ and $28.3°$ in CuKα characteristic X-ray diffraction was obtained. The powder X-ray diffraction chart of the obtained solid solution is illustrated in FIG. 5.

From the NMR measurement, it was confirmed that 34.58% by mass of the exemplary compound (1) and 3.40% by mass of N,N-dimethylformamide were contained in the solid solution.

Example 1-6

Figure 6:
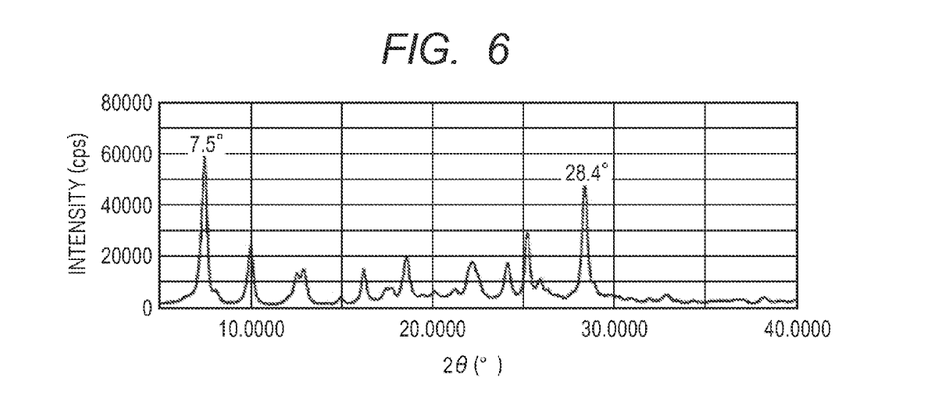
FIG. 6 is a powder X-ray diffraction chart of a solid solution obtained in Example 1-6.

In Example 1-1, 0.1 parts of the exemplary compound (1) was replaced with 0.1 parts of an exemplary compound (13) obtained by the same way as in <Example 2> described in Japanese Patent Application Laid-Open No. 2002-012791. By the same treatment as in Example 1-1 except for the replacement, 0.44 parts of a solid solution having peaks at Bragg angles $2\theta\pm0.2°$ of $7.5°$ and $28.4°$ in CuKα characteristic X-ray diffraction was obtained. The powder X-ray diffraction chart of the obtained crystal is illustrated in FIG. 6.

From the NMR measurement, it was confirmed that 9.75% by mass of the exemplary compound (13) and 3.96% by mass of N,N-dimethylformamide were contained in the solid solution.

Synthesis Example 1

Figure 7:
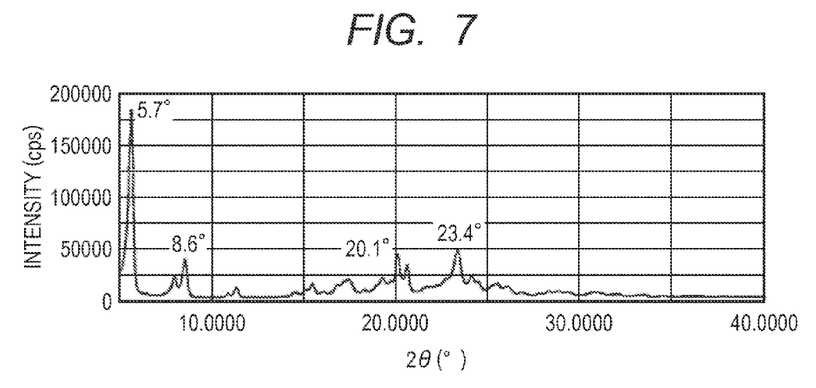
FIG. 7 is a powder X-ray diffraction chart of the crystal obtained in Synthesis Example 1.

Treatment of 0.35 parts of magnesium and 150 parts of 1-butanol was performed under heated and refluxed conditions for 2 hours. After cooling, 10 parts of 2,3-bis(4-pyridyl)-2,3-dicyanomaleonitrile were added thereto and the mixture was further heated and agitated at 100° C. for 7 hours. After the solvent was distilled away, the residue was refined with an alumina column (solvent: chloroform/methanol=5/1) so as to obtain 4.1 parts of an exemplary compound (20). Subsequently 3 parts of the obtained exemplary compound (20), 300 parts of water, and 30 parts of concentrated hydrochloric acid were subjected to an agitation treatment at room temperature for 1 hour. The mixture was neutralized with ammonia, and the precipitation was filtrated. The material on the filter was washed with water. The filtrand was dried and then refined with an alumina column (solvent: chloroform/methanol=10/1) so as to obtain 1.4 parts of an exemplary compound (19). The X-ray diffraction chart of the obtained crystal is illustrated in FIG. 7. The mass analysis data is described in the following.

MS (Direct Probe): 930.0
Calculated Exact Mass: 930.3

Example 1-7

Figure 8:
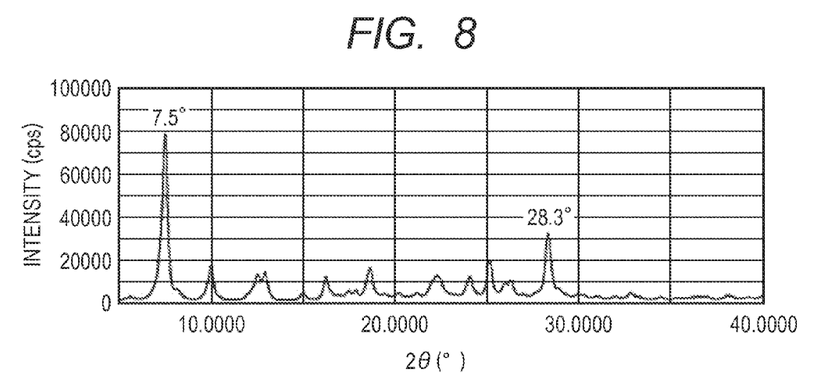
FIG. 8 is a powder X-ray diffraction chart of a solid solution obtained in Example 1-7.

In Example 1-1, 0.2 parts of the exemplary compound (1) was replaced with 0.1 parts of an exemplary compound (19) obtained in [synthesis example 1]. By the same treatment as in Example 1-1 except for the replacement, 0.49 parts of a solid solution having peaks at Bragg angles 2θ±0.2° of 7.5° and 28.3° in CuKα characteristic X-ray diffraction was obtained. The powder X-ray diffraction chart of the obtained crystal is illustrated in FIG. 8.

From the NMR measurement, it was confirmed that 11.02% by mass of the exemplary compound (19) and 2.95% by mass of N,N-dimethylformamide were contained in the solid solution.

Comparative Example 1-1

By the same treatment as in Example 1-1 except that 0.1 parts of the exemplary compound (1) was not added in Example 1-1, 0.44 parts of hydroxygallium phthalocyanine crystal were obtained. The powder X-ray diffraction of the obtained hydroxygallium phthalocyanine crystal was the same as in FIG. 8.

Comparative Example 1-2

Figure 9:
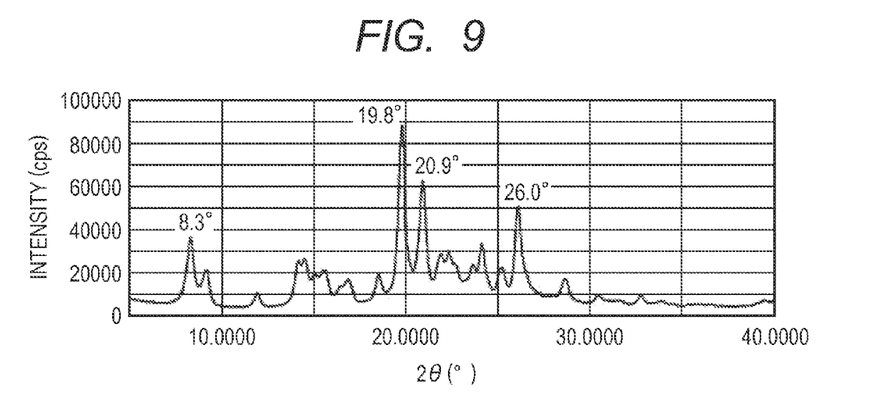
FIG. 9 is a powder X-ray diffraction chart of the crystal obtained in Comparative Example 1-2.

By the same treatment as in Example 1-1 except that no hydroxygallium phthalocyanine was added and the amount of the exemplary compound (1) was changed from 0.1 parts to 0.5 parts in Example 1-1, 0.40 parts of tetrapyridylporphyrin crystal of the exemplary compound (1) were obtained. The powder X-ray diffraction chart of the obtained crystal is illustrated in FIG. 9.

Comparative Example 1-3

Figure 10:
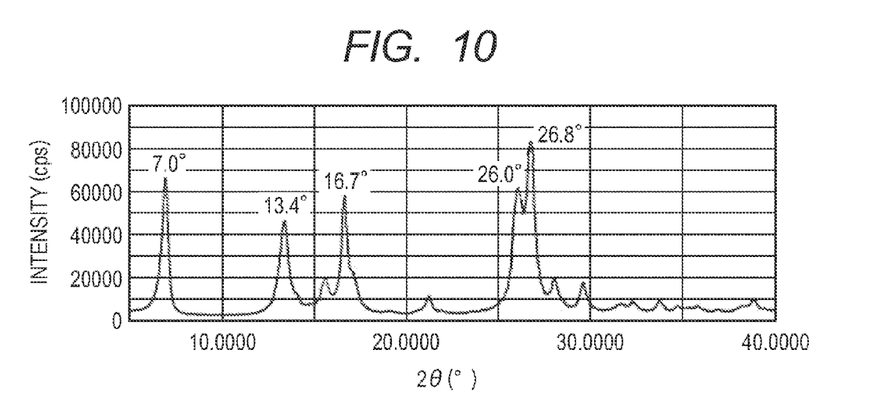
FIG. 10 is a powder X-ray diffraction chart of the crystal obtained in Comparative Example 1-3.

In Example 1-1, 9.5 parts of N,N-dimethylformamide was replaced with 9.5 parts of chloroform. By the same treatment as in Example 1-1 except for the replacement, 0.48 parts of a crystal having peaks at Bragg angles 2θ±0.2° of 7.0° and 26.8° in CuKα characteristic X-ray diffraction were obtained. The powder X-ray diffraction chart of the obtained crystal is illustrated in FIG. 10.

Example 2-1

Firstly, a solution including 60 parts of barium sulfate particles coated with tin oxide (trade name: Passtran PC1, made by Mitsui Mining & Smelting Co., Ltd.), 5 parts of titanium oxide particles (trade name: TITANIX JR, made by Tayca Corporation), 43 parts of a resol-type phenol resin (trade name: Phenolite J-325 made by DIC Corporation, solid content: 70% by mass), 0.015 parts of silicone oil (trade name: SH28PA, made by Dow Corning Toray Co., Ltd.), 3.6 parts of silicone resin (trade name: Tospearl 120, made by Momentive Performance Materials Inc.), 50 parts of 2-methoxy-1-propanol, and 50 parts of methanol, was put in a ball mill, and dispersed for 20 hours so as to prepare a coating liquid for forming a conductive layer.

The coating liquid for forming a conductive layer was applied on aluminum cylinder (diameter: 24 mm) as a support with immersion coating, and the produced coating film was dried at 140° C. for 30 minutes so that a conductive layer having a film thickness of 15 μm was formed.

Subsequently 10 parts of copolymer nylon resin (trade name: Amilan CM8000, made by Toray Industries, Inc.) and 30 parts of methoxymethylated 6-nylon resin (trade name: Tresin EF-30T, made by Nagase Chemtex Corporation) were dissolved in a mixed solvent of 400 parts of methanol and 200 parts of n-butanol so as to prepare a coating liquid for forming an undercoat layer.

The coating liquid for forming an undercoat layer was applied to the conductive layer with immersion coating, and the produced coating film was dried so that an undercoat layer having a film thickness of 0.5 μm was formed.

Subsequently, 10 parts of the solid solution (charge generating substance) produced in Example 1-1, 5 parts of polyvinylbutyral (trade name: S-LEC BX-1, made by Sekisui Chemical Co., Ltd.), and 250 parts of cyclohexanone were put in a sand mill with glass beads having a diameter of 1 mm for dispersion treatment for 4 hours. To the dispersion liquid, 250 parts of ethyl acetate was added to dilute it, thereby preparing a for forming a charge generation layer.

The coating liquid for forming a charge generation layer was applied to the undercoat layer with immersion coating. The produced coating film was dried at 100° C. for 10 minutes to form the charge generation layer having a film thickness of 0.16 μm.

Subsequently, 7 parts of a compound (charge transporting substance) represented by the following Formula (3), 1 part of a compound (charge transporting substance) represented by the following Formula (4), and 10 parts of polycarbonate (trade name: IUPILON Z-200, made by Mitsubishi Gas Chemical Company, Inc.) were dissolved in 70 parts of monochlorobenzene so as to prepare a coating liquid for forming a charge transport layer.

(3)

(4)

The coating liquid for forming a charge transport layer was applied to the charge generation layer by immersion coating. The produced coating film was dried at 110° C. for 1 hour to form a charge transport layer having a film thickness of 23 μm.

The electrophotographic photosensitive member of Example 2-1 in a cylindrical shape (drum shape) was thus manufactured.

Examples 2-2 to 2-7

Except that the solid solution in preparing the coating liquid for forming a charge generation layer in Example 2-1 was replaced with the solid solution produced in Examples 1-2 to 1-7, the electrophotographic photosensitive members in Examples 2-2 to 2-7 were made in the same way as in Example 2-1.

Comparative Example 2-1

Except that the solid solution in preparing the coating liquid for forming a charge generation layer in Example 2-1 was replaced with the hydroxygallium phthalocyanine crystals produced in Comparative Example 1-1, the electrophotographic photosensitive members in Comparative Example 2-1 were made in the same way as in Example 2-1.

Comparative Example 2-2

In Comparative Example 2-1, in addition to 10 parts of hydroxygallium phthalocyanine crystal obtained in Comparative Example 1-1, 1 part of tetrapyridylporphyrin crystal obtained in Comparative Example 1-2 was added. The electrophotographic photosensitive member in Comparative Example 2-2 was made by the same way as in Comparative Example 2-1 except for the addition.

Comparative Example 2-3

The electrophotographic photosensitive member in Comparative Example 2-3 was made by the same way as in Comparative Example 2-1 except that 10 parts of the hydroxygallium phthalocyanine crystal obtained in Comparative Example 1-1 was replaced with 10 parts of the crystal obtained in Comparative Example 1-3.

[Evaluation of Examples 2-1 to 2-7 and Comparative Examples 2-1 to 2-3]

The electrophotographic photosensitive members of Examples 2-1 to 2-7 and Comparative Examples 2-1 to 2-3 were evaluated for ghost images.

A laser beam printer made by Hewlett Packard Japan, Ltd (trade name: Color Laser Jet CP3525dn) was modified to use as an electrophotographic apparatus for evaluation. As a result of modification, a pre-exposing light was unlit and charging conditions and the amount of image exposure were variably controlled. In addition, a manufactured electrophotographic photosensitive member was mounted in a process cartridge for cyan color and attached to the station of the process cartridge for cyan, allowing for operation without mounting of process cartridges for other colors to the laser beam printer main body.

In outputting an image, the process cartridge for cyan color alone was attached to the main body so that a single color image was outputted using cyan toner alone.

The charging conditions and the amount of image exposure were adjusted such that the initial potential was set at −500V for a dark part and −100V for a bright part under a normal temperature and normal humidity environment of 23° C./55% RH. In the measurement of the surface potential of a drum-shaped electrophotographic photosensitive member for potential setting, the cartridge was modified and a potential probe (trade name: model 6000B-8, made by Trek Japan Co., Ltd.) was mounted at the development position. The potential at the center of an electrophotographic photosensitive member in a cylindrical shape was measured with a surface potential meter (trade name: model 344, made by Trek Japan Co., Ltd).

After potential setting, the evaluation of ghost images was performed under the same conditions. Subsequently, a repeated paper feed test was performed with 1,000 sheets of paper fed through, and ghost images were evaluated immediately after and 15 hours after the repeated test. Evaluation results under a normal temperature and normal humidity environment are described in Table 1.

Subsequently, the electrophotographic photosensitive member was left to stand under a low temperature and low humidity environment of 15° C./10% RH together with the electrophotographic apparatus for evaluation for 3 days so as to evaluate ghost images. A repeated paper feed test was performed with 1,000 sheets of paper fed through under the same conditions, and ghost images were evaluated immediately after and 15 hours after the repeated paper feed test. Evaluation results under the low temperature and low humidity environment are also described in Table 1.

In the paper feed durability test with paper fed through, an image of character E with a coverage rate of 1% was formed on a plain paper of A4 size with cyan single color.

Ghost images were evaluated as follows.

In the evaluation of ghost images, a solid white image was outputted on a first sheet, and 4 types of ghost charts were outputted on respective 4 sheets in total. Then, a solid black image was outputted on a sheet, and the types of ghost charts were outputted on respective 4 sheets in total once again. The images were outputted in this order, and the evaluation was performed based on the ghost images of 8 sheets in total. The ghost chart included 4 solid black square images of 25 mm side arranged in parallel at equal intervals on a solid white background in the 30 mm-width region from the starting position of printed images (10 mm from the top edge of paper). In the region below the 30 mm-width region from the starting position of printed images, 4 types of halftone printing patterns were outputted. The outputted images were classified into ranks as follows.

The 4 types of ghost charts are charts arranged in the region below the 30-mm width region from the starting position of printed images, with only difference in halftone pattern. The halftone patterns include the following 4 types:
(1) a printing pattern (laser exposing) with 1 dot and 1 space in lateral* direction;
(2) a printing pattern (laser exposing) with 2 dots and 2 spaces in lateral* direction;
(3) a printing pattern (laser exposing) with 2 dots and 3 spaces in lateral* direction; and
(4) a knight jump printing pattern (laser exposing) (a pattern with 2 dots printed in 6 squares in the knight jump direction).

*: The term "lateral" means the scanning direction of a laser beam directed at the surface of the electrophotographic photosensitive member from a laser scanner (the direction orthogonal to the outputting direction of the sheet outputted from the laser beam printer).

The ghost images were classified into ranks as follows. It was determined that the effect of the present invention was insufficient in the ranks 4, 5 and 6.

Rank 1: No ghosting was visible in any of the ghost charts.
Rank 2: Ghosting was vaguely visible in a specific ghost chart.
Rank 3: Ghosting was vaguely visible in any of the ghost charts.
Rank 4: Ghosting was visible in a specific ghost chart.
Rank 5: Ghosting was visible in any of the ghost charts.
Rank 6: Ghosting was sharply visible in a specific ghost chart.

TABLE 1

| | Ghost image evaluation results | | | | | |
| --- | --- | --- | --- | --- | --- | --- |
| | Under normal temperature and normal humidity environment | | | Under low temperature and low humidity environment | | |
| | Initial stage Ghost rank | Immediately after durability test Ghost rank | 15 hours after durability test Ghost rank | Initial stage Ghost rank | Immediately after durability test Ghost rank | 15 hours after durability test Ghost rank |
| Example 2-1 | 1 | 2 | 2 | 2 | 2 | 2 |
| Example 2-2 | 1 | 2 | 2 | 1 | 2 | 2 |
| Example 2-3 | 2 | 2 | 2 | 2 | 3 | 3 |
| Example 2-4 | 2 | 3 | 3 | 3 | 3 | 3 |
| Example 2-5 | 2 | 3 | 2 | 2 | 3 | 3 |
| Example 2-6 | 1 | 2 | 2 | 2 | 3 | 3 |
| Example 2-7 | 2 | 2 | 2 | 2 | 3 | 3 |
| Comparative Example 1-1 | 4 | 5 | 4 | 5 | 6 | 5 |
| Comparative Example 1-2 | 4 | 5 | 5 | 5 | 6 | 6 |
| Comparative Example 1-3 | Due to defective charging, the initial potential was unable to be set at −500 V for a dark part, so that no evaluation was made. | | | | | |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-128302, filed Jun. 23, 2014, which is hereby incorporated by reference herein in its entirety.

What is claimed is:

1. An electrophotographic photosensitive member comprising a support and a photosensitive layer on the support;
the photosensitive layer comprising a solid solution of hydroxygallium phthalocyanine and a compound represented by the following Formula (1) or Formula (1)';
the solid solution having peaks at Bragg angles 2θ of 7.4°±0.3° and 28.3°±0.3° in CuKα characteristic X-ray diffraction:

(1)

(1)' wherein M represents a metal atom which may have an axial ligand; X represents a carbon atom or a nitrogen atom; $R^1$ to $R^{12}$ each independently represent a hydrogen atom, a substituted or unsubstituted aryl group, or a substituted or unsubstituted a heterocyclic group, with the proviso that in the case of X being a nitrogen atom, the ring is closed and none of substituents $R^1$ to $R^4$ exists.

2. The electrophotographic photosensitive member according to claim 1, wherein X in the Formula (1) or the Formula (1)' is a carbon atom, and $R^1$ to $R^{12}$ are each independently a hydrogen atom, an aryl group or a heterocyclic group.

3. The electrophotographic photosensitive member according to claim 1, wherein $R^5$ to $R^{12}$ in the Formula (1) or the Formula (1)' are each a hydrogen atom.

4. The electrophotographic photosensitive member according to claim 2, wherein $R^1$ to $R^4$ in the Formula (1) or the Formula (1)' are each a pyridyl group.

5. The electrophotographic photosensitive member according to claim 4, wherein $R^1$ to $R^4$ in the Formula (1) or the Formula (1)' are each a 4-pyridyl group.

6. The electrophotographic photosensitive member according to claim 1, wherein X in the Formula (1) or the Formula (1)' is a nitrogen atom and $R^5$ to $R^{12}$ are each independently a hydrogen atom, an aryl group or a heterocyclic group.

7. The electrophotographic photosensitive member according to claim 6, wherein $R^5$ to $R^{12}$ in the Formula (1) or the Formula (1)' are each a phenyl group or a pyridyl group.

8. The electrophotographic photosensitive member according to claim 1, wherein the photosensitive layer comprises the solid solution of the hydroxygallium phthalocyanine and the compound represented by the Formula (1)'.

9. The electrophotographic photosensitive member according to claim 1, wherein the solid solution contains at least one selected from the group consisting of N,N-dimethylformamide and N-methylformamide.

10. The electrophotographic photosensitive member according to claim 1, wherein the solid solution has a content of the compound represented by the Formula (1) or the Formula (1)' of 5% by mass or more and 30% by mass or less.

11. A process cartridge which integrally supports:
an electrophotographic photosensitive member according to claim 1; and at least one unit selected from the group consisting of a charging unit, a developing unit and a cleaning unit;
the process cartridge being detachably mountable to a main body of an electrophotographic apparatus.

12. An electrophotographic apparatus comprising an electrophotographic photosensitive member according to claim 1, a charging unit, an exposure unit, a developing unit and transfer unit.

13. A solid solution of hydroxygallium phthalocyanine and a compound represented by the following Formula (1) or Formula (1)';
the solid solution having peaks at Bragg angles 2θ of 7.4°±0.3° and 28.3°±0.3° in CuKα characteristic X-ray diffraction:

(1)

(1)' wherein M represents a metal atom which may have an axial ligand; X represents a carbon atom or a nitrogen atom; $R^1$ to $R^{12}$ each independently represent a hydrogen atom, a substituted or unsubstituted aryl group, or a substituted or unsubstituted a heterocyclic group, with the proviso that in the case of X being a nitrogen atom, the ring is closed and none of substituents $R^1$ to $R^4$ exists.

14. The solid solution according to claim 13, wherein the content of the compound represented by the Formula (1) or Formula (1)' is 5% by mass or more and 30% by mass or less.

15. The solid solution according to claim 13, the solid solution is obtained by adding the hydroxygallium phthalocyanine and the compound represented by the Formula (1) or the Formula (1)' to a solvent, and performing a milling treatment of the mixture.

16. The solid solution according to claim 15, wherein the hydroxygallium phthalocyanine is obtained by an acid pasting of a gallium phthalocyanine halide.

17. The solid solution according to claim 15, wherein the solvent is at least one selected from the group consisting of N,N-dimethylformamide and N-methylformamide.

* * * * *